United States Patent Office 3,401,141
Patented Sept. 10, 1968

3,401,141
POLYURETHANE WITH ACETYLENE BLACK AS THIXOTROPIC AGENT
Richard H. Toth, Port Clinton, Ohio, assignor to The Standard Products Company, Cleveland, Ohio, a corporation of Ohio
No Drawing. Filed June 14, 1965, Ser. No. 463,928
6 Claims. (Cl. 260—37)

ABSTRACT OF THE DISCLOSURE

A moisture curable polyurethane sealant composition having improved properties due to the inclusion of from about 2.5% to about 15% by weight of composition, of acetylene black as a thixotropic agent.

---

The present invention relates to polyurethane compositions and more particularly relates to an elastomeric isocyanate terminated moisture curable polyurethane sealant composition comprising a polyurethane polymer and a thixotropic agent.

It is desirable to use a flexible sealant for sealing of joints of limited movement such as in building construction. It is also desirable that the flexible sealant be easily applied to the joint.

In preparing flexible polyurethane sealant compositions, it is desirable to use a thixotropic agent that provides for easy application of the sealant and, after application, a resistance to undesired flow.

It is an object of the present invention to provide a polyurethane sealant composition that has good properties of elongation, can be easily applied to joint surfaces and has good resistance to flow.

It is an object of the present invention to provide a polyurethane sealant composition comprising a moisture curable polyurethane prepolymer, a filler, a fungicide and a thixotropic agent to thicken the same and help provide resistance to flow.

It is an object of the present invention to provide a sealant composition having a Shore A hardnes swhen cured of at least about 10, and an elongation at break of at least about 300%, the composition comprising (1) a polyurethane prepolymer having isocyanate end groups for reaction with moisture to cure said prepolymer, (2) a filler, (3) a fungicide and (4) a thixotropic agent comprising acetylene black to provide the composition with ease of application and resistance to undesirable flow after application.

These and other objects will become apparent from the specification that follows and the appended claims.

The present invention provides a moisture curable sealant composition comprising (1) a polyurethane prepolymer having isocyanate end groups for reaction with moisture to cure the prepolymer, (2) a filler, (3) fungicide and (4) acetylene black to thicken the composition, to enable the composition to be easily applied to joint surfaces, and to help provide the composition with resistance to flow after the same is applied.

In the sealant compositions, suitable fillers are calcium carbonate, silica, talc, wollastonite and glass. The fillers are generally used in the range of about 2 to 50% by weight and preferably about 10 to 20% by weight of the prepolymer.

The preferred fungicide is zinc oxide, although Dowicide, a series of phenolic compounds sold by Dow Chemical Company, Midland, Mich., and Aroclor, a series of polychlorinated polyphenyls sold by Monsanto Chemical Company, St. Louis, Mo., can be used. An antioxidant such as, for example, 2,6-di-tertiary-butyl p-cresol, can be used in amount of about 1/20 to 1% by weight of the prepolymer.

The acetylene black thixotropic agent and non-sag agent can be used in amounts as low as about 2½ to 3% by weight of the total composition to provide some self-leveling properties and some non-sag properties whereby the resultant sealant compositions are unexpectedly easy to apply to joint surfaces and highly resistant to flow once they are applied to the joint surfaces. Amounts of acetylene black as high as about 15% by weight of the composition or about 5% by weight of the prepolymer can be used, but higher amounts provide little or no additional non-sag benefits. In any event, the preferred range of acetylene black is about 5 to 10% by weight of the total composition.

As to the polyurethane prepolymer having preferably at least an average of about 1½ isocyanate end groups per prepolymer molecule for proper moisture curing action, a preferred prepolymer is one that is a reaction product of an isocyanate terminated triol-based polyurethane prepolymer and an epoxy resin condensation product, the resultant reaction product containing a mixture of isocyanate terminal groups and epoxy terminal groups.

The above described polymer also finds use in adhesives and in coatings. Thus, the polymer and its compositions are useful in building trade construction in seams and joints for roads, for vehicle construction such as boats and aircraft, and for floor coverings.

In accordance with a preferred embodiment of the present invention, a polyisocyanate terminated polyether having an isocyanate content of about 0.5% to 15% and preferably about 1% to 12% is reacted with an hydroxy containing epoxide or oxirane whereby preferably about 10 to 50% of the available isocyanate terminal groups of said polyether are replaced by the epoxide by reaction of said isocyanate groups with active hydrogen atoms of said epoxide. Thus, a reaction product is provided having both isocyanate terminal groups and epoxy end groups inasmuch as some isocyanate groups are not reacted with the active hydrogen atoms of the epoxide. Hence, that portion of the molecule formerly terminated by one of the reacted isocyanate groups is now replaced by two or more epoxy end groups.

Suitable epoxy groups are provided for the resultant reaction product by an hydroxy containing epoxy resin that is the reaction product of an aliphatic organic compound having an ethylene oxide group on its molecular chain end and an organic polyhydric alcohol having two to three hydroxyl groups and three to seventeen carbon atoms. It is preferred that the condensation product have an epoxy equivalent of about 105 to 210 and, in any event, at least above 100. Preferably, the epoxy resin condensation product is a reaction product of epichlorohydrin and an organic polyhydric alcohol such as bisphenol A, the reaction product having a hydroxyl group for reaction with an isocyanate group and epoxide end groups.

For the best results, the epoxy resin reaction product is one having a molecular weight of about 384 and formed from epichlorohydrin and bisphenol A [(2,2-) (para-hydroxy phenyl) propane] having an epoxide equivalent weight of at least about 100. One preferred epoxy resin condensation product is Epon 828 which is an epoxy resin condensation product of epichlorohydrin and bisphenol A having a molecular weight of about 384 sold by Shell Chemical Corporation. Other suitable organic polyhydric alcohols as a starting material to make the epoxy resin are those having 2 to 3 hydroxyl groups and having 3 to 17 carbon atoms such as bisphenol C [2,2-bis (4-hydroxy-5-methyl phenyl) propane], glycerol, and ethylene glycol.

In accordance with the present invention, suitable epoxy resins are commercially available such as those having molecular weights of 350 to 4000 or more which are sold as Epon resins by the Shell Chemical Corporation.

The molecular weight of the preferred epoxy resins used in the present invention is about 350 to 450, the resins being generally liquids in this molecular weight range although the solid epoxy resins can be used by dissolving in the isocyanate terminated polyether or by dissolving in an organic diluent such as allyl glycidyl ether, butyl glycidyl ether and phenyl glycidyl ether, etc. and the solutions are sold as epoxy resins. Even the lower molecular weight hydroxy-containing epoxy resins may be prepared with from about 5 to 25 percent by weight of the above described diluents. An example of a straight low molecular weight epoxy resin is Epon 228, a liquid condensation product of a molecular weight of about 384. An example of a diluted epoxy resin, also a preferred epoxy resin material, is Epon 820 which is Epon 828 resin diluted with allyl glycidyl ether in which the diluent is about 15 percent of the weight of the epoxy resin.

The effect of varying reactant mol ratios of the starting reactants (epichlorohydrin and bisphenol A in the presence of excess caustic) on the molecular weight of the resultant hydroxy containing epoxide is generally such that a mol ratio of epichlorohydrin to bisphenol A of about 2/1 produces an epoxide with a softening point of about 43° C., a molecular weight of about 451, an epoxide equivalent of about 314 and 1.39 epoxy groups per molecule. A mol ratio of about 1.2/1 produces an epoxide having a softening point of about 112° C., a molecular weight of about 1420 and about 1.21 epoxy groups per molecule. Typical commercial epoxy resins that are suitable for use in the present invention are listed in Table I–3 on pages 19 and 20 of "Epoxy Resins" by Lee and Neville, McGraw-Hill Book Company, Inc., 1957, which table is made a part of the present disclosure by reference.

In accordance with a preferred embodiment of the present invention, the triol-based polyurethane prepolymer is formed by reacting a polyalkylene ether glycol/diisocyanate prepolymer having two isocyanate end groups with a triol that is a reaction product of (1) an aliphatic polyol having up to 7 carbon atoms and preferably 3 hydroxyl groups such as trimethylol propane, glycerol and hexane triol and (2) an alkylene oxide such as ethylene oxide and butylene oxide and preferably propylene oxide. The resultant triol-based prepolymer has a viscosity generally in the range of about 8,000 to 15,000 centipoises and is a mixture of (1) a triol molecule having a triol base and 3 isocyanate end groups and (2) the starting material with two terminal isocyanate groups, namely, the polyalkylene ether glycol/diisocyanate prepolymer. The resultant triol-based prepolymer has an —NCO content of about 0.5 to 15% by weight and a preferable range of 0.6 to 10% by weight. For optimum results, the isocyanate content is about 2 to 6%. The total triol-based prepolymer of course has some unreacted or excess isocyanate terminated polyether with two isocyanate end groups.

Although it is preferred for most sealant applications that only a portion of the available isocyanate end groups be replaced by a molecule of the epoxy resin, and hence said one isocyanate end group is replaced by two or more epoxy groups, two of the isocyanate groups can each be replaced by an epoxy resin molecule so that the resultant product will have an average of one isocyanate end group and four epoxy end groups.

Instead of reacting one equivalent weight of the prepolymer having an average of three isocyanate end groups with about one-third hydroxy equivalent weight of the epoxy resin to provide the above described preferred product, about two-thirds of an hydroxy equivalent weight of the hydroxy containing epoxy resin can be reacted per one equivalent weight of the tri-isocyanate terminated prepolymer.

As there are less and less —NCO end groups in the final prepolymer product, the cured polymer becomes tougher and its capability of being cured by moisture is reduced. If the average number of —NCO end groups drops below about 1½ per prepolymer molecule, there is no longer a substantial curing reaction. Hence, if there are six epoxy end groups, the polymer cannot be cured by moisture. As the average number of epoxy end groups increases, the toughness, modulus and tensile strength increase.

The following example is intended to illustrate the present invention and not to limit the same in any way:

Example 1

A first isocyanate prepolymer was prepared by mixing together 5290 lbs. of a diol derived from ethylene oxide having an average molecular weight of about 2000 and 917 lbs. of an 80/20 mixture of 2,4- and 2,6-tolylene diisocyanates. The resultant mixture was heated to 170° F., after which, due to the heat of reaction, the temperature rose to 180–185° F. The temperature is maintained at 180–185° F. until the viscosity of the reaction mass reached Z to Z–1 on the Gardner Holdt Scale. Thereafter, the reaction mass was cooled to 155° F. and 1725 lbs. of an organic triol derived from trimethylol propane and propylene oxide were added and the resultant reaction mixture cooled to 125° F. At the temperature of 125° F., 1.55 lbs. of stannous octoate was added as a reaction catalyst, whereupon the temperature of the reaction mixture rose to 140° F. where the temperature was maintained until the proper —NCO content was determined by analysis to 2% by weight.

The resultant liquid reaction mass is a second isocyanate terminated polyurethane prepolymer having an average of about three —NCO end groups per each molecule.

The second isocyanate terminated polyurethane prepolymer was thereafter reacted with a liquid epoxy resin to provide the final polyurethane-epoxy polymer that is suitable for use as a sealant.

The second prepolymer, in the amount of 122 lbs., was mixed with 1.875 lbs. of a liquid epoxy resin that is a condensation product of epichlorohydrin and bisphenol A having a molecular weight of about 384. The mixture was reacted at a temperature of about 125° F. for 15 minutes to provide a reaction product of (1) the above described isocyanate terminated polyurethane prepolymer having three terminal isocyanate groups and (2) the above described epoxide or condensation product, the resultant reaction product having a mixture of isocyanate end groups and epoxy end groups. The reaction product includes a triol-based prepolymer having two isocyanate end groups and two epoxy end groups inasmuch as one of the three original isocyanate end groups of the triol-based prepolymer is replaced by one molecule of the epoxy resin condensation product through the reaction of said isocyanate group with an active hydrogen atom of the condensation product.

In the above example, other diols can be used such as a polyethylene ether glycol having an average molecular weight of about 2000, this being the preferred diol material. Such a preferred diol is P2010, a polyalkylene ether glycol sold by the Wyandotte Chemical Company, Wyandotte, Mich. Polypropylene ether glycols, polytetramethylene ether glycols and other polyalkylene ether glycols having an average molecular weight in the range of about 124 to 3000 can be used.

Other organic triols can be substituted for the triol in the example. Generally, the triol should have an average molecular weight of about 109 to 6000. One preferred triol is Pluracol TP4040 triol, a triol sold by the Wyandotte Chemical Company, having an average molecular weight of about 4100 that is a reaction product of trimethylol propane and propylene oxide. Suitable triols are those polyoxypropylene derivatives of trimethylol propane called Pluracol TP, Polyglycol 112–3, a triol derived from glycerine and ethylene and propylene oxides, and Niax LHT, a polyalkylene ether glycol having an average molecular weight of about 1500 and having 3 terminal OH groups, being formed from a reaction of propylene oxide and 1,2,6-hexanetriol.

The 80/20 mixture of 2,4- and 2,6-tolylene diisocyanates used in the examples can be substituted in whole or part by either of the above tolylene diisocyanates as well as by other organic diisocyanates such as p,p'-diisocyanato diphenyl methane, hexmethylene diisocyanate and durene diisocyanate. However, a mixture of 2,4- and 2,6-tolylene diisocyanates is highly preferred.

Likewise, the glycol used to react with the above diisocyanate to form the first isocyanate polyurethane prepolymer can be polypropylene glycol, polytetramethylene ether glycol and other glycols having two hydroxyl groups for reaction with the isocyanate groups of the diisocyanate.

Example 2

The polyurethane prepolymer of Example 1, having a mixture of isocyanate terminal groups and epoxy terminal groups, was used in a sealant formulation to provide an excellent non-sag composition as follows:

Ingredients: Parts by weight
Polyurethane prepolymer of Example 1 _____ 100
Filler: calcium carbonate _____ 25
Acetylene black _____ 6

The resultant sealant composition was applied with ease to a joint surface in the building construction industry. The composition was non-sagging and hence, highly resistant to undesirable flow after being applied to the joint surface.

Surprisingly, only acetylene black provides all the above described desirable sealant properties including the non-sagging property. Carbon black such as furnace carbon black, including high abrasion furnace black, was tried in place of the acetylene black of Example 2. However, while a relatively large amount, namely, 15 parts by weight per 100 parts by weight of the prepolymer, provided some self-leveling properties to the composition, the resultant composition was difficult to apply to the same joint surfaces and sagged badly in service and hence, was undesirable.

Acetylene black is a type of carbon black made from acetylene gas, preferably by continuous thermal decomposition. Acetylene black can also be made by explosion, combustion in an oxygen-deficient atmosphere or electric arc methods.

The acetylene blacks are generally electrically conducting, and are easily dispersed. A typical analyses of various acetylene blacks is as follows:

| Type | Moisture, percent | Volatile, percent | Ether extract | Ash, percent |
|---|---|---|---|---|
| Thermal acetylene black | 0.04 | 0.06 | 0.03 | 0.04 |
| Acetylene explosion black | 0.06 | 1.0 | 0.05 | 0.03 |
| Acetylene channel black | 0.38 | 3.6 | 1.6 | 0.06 |

Thermal acetylene black is generally the preferred thixotropic agent and is commercially produced in a particle size having an average dimension of about 400 to 600 Angstrom Units A. and preferably 500 A. under the electron microscope. The particle size according to other measurements, are a mean particle diameter of about 1300 A. by ultramicroscopy. Nitrogen absorption measurements of a mean particle of 500–520 A. and a surface area of about 64 sq. m./grams have been reported.

Under the microscope, the thermal acetylene black is seen to have apparently a structure of carbon particles joined together in a chainlike fashion to provide the black with a three-dimensional fishnet structure.

It is to be understood that, in accordance with the provisions of the patent statutes, variations and modifications of the specific invention herein shown and described may be made without departing from the spirit of the invention.

What is claimed is:

1. A moisture curable sealant composition comprising (1) a polyurethane prepolymer having on the average, at least about 1.5 isocyanate end groups per prepolymer molecule for reaction with moisture for curing said prepolymer and (2) at least about 2.5% by weight of total composition of acetylene black, as a thixotropic agent, to provide ease of application of said composition and to help provide the composition with resistance to undesirable flow.

2. A moisture curable polyurethane sealant composition comprising (1) a polyurethane prepolymer having on the average, at least about 1.5 isocyanate terminal groups per prepolymer molecule (2) a thixotropic agent consisting of acetylene black present in an amount within the range of about 2.5% to about 15% by weight of total composition, and (3) a filler, different from ingredient (2), present in an amount within the range of 2% to about 50% by weight of said prepolymer.

3. The composition as defined in claim 2 wherein said filler is calcium carbonate.

4. A moisture curable sealant comprising (1) the reaction product of an isocyanate terminated polyurethane prepolymer having an —NCO content of from about 0.5 wt. percent to about 15 wt. percent and a hydroxy containing, polyglycidyl ether of a polyhydric alcohol, the reaction product containing a mixture of isocyanate terminal groups and epoxy terminal groups, the latter constituting a replacement of from about 10% to about 50% of the —NCO groups of said prepolymer, and (2) at least about 2.5% by weight of total composition of acetylene black as a thixotropic agent, to provide ease of application of said composition and to help provide the composition with resistance to undesirable flow.

5. A moisture curable sealant comprising (1) the reaction product of an isocyanate terminated polyurethane prepolymer having an —NCO content of from about 0.5 wt. percent to about 15 wt. percent and a hydroxy containing, polyglycidyl ether of a polyhydric alcohol, the reaction product containing a mixture of isocyanate terminal groups and epoxy terminal groups, the latter constituting a replacement of from about 10% to about 50% of the —NCO groups of said prepolymer, and (2) a thixotropic agent consisting of acetylene black present in an amount within the range of about 2.5% to about 15% by weight of total composition, and (3) a filler, different from ingredient (2), present in an amount within the range of about 2% to about 50% by weight of said prepolymer.

6. The composition as defined in claim 5 wherein said filler is calcium carbonate.

References Cited

UNITED STATES PATENTS

| | | | |
|---|---|---|---|
| 3,010,940 | 11/1961 | Charlton et al. | 260—37 |
| 3,012,984 | 12/1961 | Hudson | 260—37 |
| 3,158,586 | 11/1964 | Krause | 260—37 |
| 3,164,572 | 1/1965 | Axelrood | 260—37 |

MORRIS LIEBMAN, *Primary Examiner.*

H. S. KAPLAN, *Assistant Examiner.*